United States Patent Office 3,546,300
Patented Dec. 8, 1970

3,546,300
CONVERSION OF GEM-DIALKOXY COMPOUNDS TO UNSATURATED ETHERS USING CaCl₂
Roger C. Williamson, Allison Park, Pa., assignor to Gulf Research & Development Company, Pittsburgh, Pa., a corporation of Delaware
No Drawing. Filed July 5, 1968, Ser. No. 742,515
Int. Cl. C07c *43/16, 43/02*
U.S. Cl. 260—614          8 Claims

ABSTRACT OF THE DISCLOSURE

A gem-dialkoxy compound is catalytically cracked to an unsaturated ether and an alcohol at a temperature of at least 225° C. using $CaCl_2$ as the catalyst. For example, dimethylacetal can be cracked to methyl vinyl ether and methanol using $CaCl_2$ either supported or unsupported.

---

This invention relates to the conversion of gem-dialkoxy compounds to unsaturated ethers using a catalyst comprising calcium chloride.

The thermal and catalytic conversion of gem-dialkoxy compounds, such as dimethylacetal $$(CH_3-CH(OCH_3)_2)$$

to unsaturated ethers, such as methyl vinyl ether $$(H_2C=CH-OCH_3)$$

is known in the art. Various catalysts have been proposed, but these catalysts are either expensive, i.e., platinum (U.S. Pat. 1,931,858) or result in poor conversions and/or yields.

It has now been found that high conversions of gem-dialkoxy compounds with excellent efficiency to the production of the desired unsaturated ethers can be achieved by cracking gem-dialkoxy compounds using a catalyst comprising chloride.

In accordance with the invention, a gem-dialkoxy compound having the formula:

where R, R' and R" are selected from the group consisting of hydrogen, phenyl or alkyl groups having from one to 20 carbon atoms, preferably one to seven carbon atoms; and R'" is an alkyl group having from one to seven carbon atoms is converted to an unsaturated ether by contacting the gem-dialkoxy compound with a catalyst comprising calcium chloride at a temperature of at least 225° C.

The charge stock to be converted comprises a gem-dialkoxy compound having the formula:

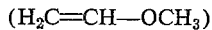

where R, R' and R" are selected from the group consisting of hydrogen, phenyl or alkyl groups having from one to 20, preferably one to seven, carbon atoms; and R'" is an alkyl group having from one to seven carbon atoms. Preferably, R, R' and R" are either hydrogen or a saturated alkyl group having from one to about seven carbon atoms and R'" is a saturated alkyl group having from one to about seven carbon atoms. The gem-dialkoxy compound suitably has from 4 to 30 carbon atoms and preferably has from 4 to 12 carbon atoms.

The gem-dialkoxy compounds can be prepared by any suitable procedure. For example, a desired olefin, such as ethylene, can be oxidized in the presence of a desired alcohol, such as methanol, and a catalyst such as palladium chloride and cuprous chloride to produce a desired gem-dialkoxy compound, such as dimethylacetal. The dimethyl, diethyl, diisopropyl, dibutyl, diamyl, dihexyl and diheptyl acetals of aldehydes such as acetaldehyde, propylaldehyde, butryaldehyde, valeraldehyde, hexaldehyde, octaldehyde and nonaldehyde can be prepared and employed in the process of this invention as well as gem-dialkoxy compounds prepared using ketones such as acetone, methylethylketone, dipropylketone, diethylketone, diisobutylketone, benzylmethylketone, etc. rather than the aldehydes above.

Examples of suitable gem-dialkoxy compounds which can be used in the process of this invention include, but are not limited to:

dimethylacetal;
1,1-dimethoxypropane;
1,1-dimethoxy-l-phenyl ethane;
2,2-diethoxy propane;
1,1-dimethoxy-2-phenyl ethane;
1-1-dipentoxy ethane;
3,3-diethoxy nonane;
2,2-diethoxy-3-propyl-hexane; and
1,1-dimethoxyeicosane.

The gem-dialkoxy compound will be converted to an unsaturated ether and an alcohol in accordance with Equation I below:

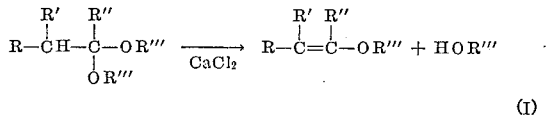

(I)

where R, R', R" and R'" are as defined above. For example, dimethylacetal upon cracking in accordance with the invention yields methyl vinyl ether and methanol. Similarly, 1,1-diethoxypropane will yield ethylpropenyl ether and ethyl alcohol. Other unsaturated ethers which can be produced from a suitable gemdialkoxy compound include, for example, isopropyl vinyl ether, buty vinyl ether, methyl-1-butenyl ether, methyl-1-octenyl ether, butyl-3-octenyl ether, etc.

The conversion of gem-dialkoxy compounds to unsaturated ethers is essentially a cracking reaction. The reaction usually occurs in the vapor phase and diluent materials which are also usually gaseous under the conditions required to crack the gem-dialkoxy compounds can also be admixed with the gem-dialkoxy compound provided they are inert in the reaction. Suitable inert volatile materials which can be admixed with the gem-dialkoxy compounds include inert gases such as nitrogen and carbon dioxide or aliphatic alcohols such as methanol, ethanol, ethers or hydrocarbons such as methane, ethane, pentane, benzene, hexene and water.

The catalyst comprises calcium chloride as the active ingredient. The calcium chloride can be used either unsupported or distended on an inert, preferably non-acidic, type support such as glass beads, quartz and diatomaceous earth. When the calcium chloride is employed unsupported, which is the preferred form of the catalyst, it can suitably be employed in finely comminuted form such as a mesh size between 2 and 40, or in a powder form if a fluidized bed operation is desired. The size of the catalyst particles is not critical.

When the calcium chloride is distended on a support it can be deposited on the support material by any suitable means well known in the art. One suitable means is to dissolve the desired amount of calcium chloride in water and to impregnate the support material with the aqueous solution of calcium chloride followed by drying and, if desired, calcining. The amount of calcium chloride to be distended on the support material can vary between one and 90 weight percent and is preferably between 10 and 40 weight percent of the final catalyst. The preferred support materials are the inert, non-acidic type supports such as steamed silica gel, steamed alumina, glass beads, quartz and the infusorial earths such as diatomaceous earth. After the calcium chloride is thoroughly admixed or distended on the support material the solids can, if desired, be calcined by heating the dried catalyst product at temperatures from about 500° to about 1000° F. for about 0.5 to ten hours.

The conversion of the gem-dialkoxy compounds is suitably conducted at a temperature of at least 225° C. Temperatures below 225° C. result in conversions which are less than desired. The upper reaction temperature can suitably be as high as 450° C. Preferably, the reaction temperature is between 250° and 350° C. The reaction pressure is preferably atmospheric; however, subatmospheric and superatmospheric pressures can be employed from about 0.1 to about 20 atmospheres. Since the reaction usually occurs in the vapor phase, pressures from subatmospheric to atmospheric pressure are preferred. The usual liquid hourly space velocities which can be employed range from about 0.1 to about five and preferably are from about 0.5 to about two.

The reaction procedure is quite simple and involves passing the gem-dialkoxy compound through a heated column or bed of the calcium chloride catalyst. The gem-dialkoxy compound can be preheated prior to entry into the reaction zone or a portion or all of the preheat can be supplied by preheating the catalyst itself. This latter preheating is particularly suitable when a fluidized bed of catalyst is employed. The crude reaction product is condensed upon leaving the reaction zone to prevent any decomposition. The product is thereafter fractionated to recover the volatile unsaturated ether as the main desired product of the reaction. The liquid residue from the fractionation comprises the alcohol formed during the decomposition or cracking of the gem-dialkoxy compound together with any condensed diluent employed during the reaction period.

The invention will be further described with reference to the following experimental work.

In the experimental work a solution of five grams of dimethylacetal (DMA) in 20 cc. of methanol was passed through a tower containing the calcium chloride either supported or unsupported at a rate of about 0.5 cc. per minute (a liquid hourly space velocity of about 0.2). Nitrogen was bubbled through the acetalmethanol solution to facilitate the flow of DMA through the column. A mixture of DMA in methanol was used since this mixture approximates the composition that one would get by the preparation of DMA by the oxidation of ethylene in methanol using the palladium-copper catalyst system mentioned above. The gases from the tower were trapped in a series of Dry Ice traps and analyses were made on the liquid composites.

The supported catalysts were prepared by impregnating 50 grams of pelletized "Celite 408" with an excess of an aqueous solution of the catalyst, decanting excess solution and then drying at 180° C. under vacuum. The amount of calcium chloride deposited on the Celite 408 was 26 weight percent. The reaction column used was a glass reactor (400 millimeters long by 8 millimeters I.D.) with the catalyst occupying about 350 millimeters of this length. The "Celite 408" is a diatomaceous earth.

A series of runs was made at increasing temperatures using a four mesh unsupported calcium chloride catalyst. The results of this series of runs are shown in Table I below:

TABLE I.—PYROLYSIS OF 5 GRAMS OF DIMETHYLACETAL (DMA) IN 20 cc. METHANOL

| Ex. No. | Catalyst | Temp., °C. | Percent conversion DMA [1] | Percent efficiency to methyl vinyl ether [2] |
|---|---|---|---|---|
| 1 | 4 mesh CaCl$_2$ | 260 | 50 | 93 |
| 2 | do | 300 | 78 | 93 |
| 3 | do | 350 | 91 | 93 |
| 4 | 26 wt. percent CaCl$_2$ on "Celite 408" | 270 | 60 | 93 |
| 5 | do | 300 | 75 | 93 |
| 6 | do | 325 | 81 | 89 |
| 7 | do | 360 | 85 | 80 |

[1] By percent conversion is meant the grams of reacted DMA divided by the grams of DMA charged times 100.
[2] By percent efficiency is meant the grams of methyl vinyl ether produced divided by the grams which should have been produced if all of the converted DMA had been recovered as methyl vinyl ether times 100.

Referring to Table I above, the efficiency of conversion of dimethylacetal to methyl vinyl ether was very high (93 percent) for Examples 1–3 using reaction temperatures from 260° C. to 350° C. As expected, the conversion increases with temperature from 50 to 91 percent as the reaction temperature increases from 260° C. (Example 1) to 350° C. (Example 3). It was surprising, however, that the efficiency to methyl vinyl ether would be maintained at the high 93 percent level as the reaction temperature and conversion increased.

A second series of runs was made at increasing temperatures using the Celite 408 supported calcium chloride catalyst which contained 26 weight percent calcium chloride. The results of this series of runs are given in Table I above as Examples 4–7.

Referring to Table I above, the reaction temperature increased from 270° C. (Example 4) to 360° C. (Example 7). The conversion progressively increased with increased temperature but the weight percent efficiency to methyl vinyl ether decreased somewhat at the higher temperature levels. Thus, a 93 percent efficiency was obtained at temperatures of about 300° C. and below (Examples 4 and 5) while the efficiency decreased to between 80 and 90 percent for the higher reaction temperatures up to 360° C. (Examples 6 and 7).

A comparison of Examples 1–7 shows that the maximum conversion and efficiency are obtained using the unsupported calcium chloride catalyst. For some unknown reason, the unsupported calcium chloride results in a higher conversion at 350° C. (Example 3) than does the supported calcium chloride catalyst at 360° C. (Example 7).

When the pyrolysis of dimethylacetal was attempted over Celite 408 pellets at temperatures of 300°–350° C., good efficiency to methyl vinyl ether was obtained (over 90 percent) but very low conversions of less than 2 to 15 percent were obtained. Glass beads reacted similarly to the Celite 408 pellets. When barium chloride (BaCl$_2$), magnesium chloride and zinc chloride were used in place of calcium chloride on the Celite support at temperatures of about 300° C., much lower efficiencies in the case of the barium and zinc chlorides and lower conversions in the case of magnesium chloride were experienced. Thus, calcium chloride appears to be unique in its ability to catalytically crack gem-dialkoxy compounds to unsaturated ethers in high conversions and high efficiencies.

Resort may be had to such variations and modifications as fall within the spirit of the invention and the scope of the appended claims.

1. A process for the conversion of a gem-dialkoxy compound to an unsaturated ether which comprises contacting a gem-dialkoxy compound having the formula:

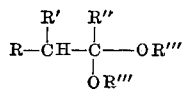

where R, R' and R'' are selected from the group consisting of hydrogen, phenyl or alkyl groups having from one to 20 carbon atoms; and R''' is an alkyl group having from one to about seven carbon atoms, with a catalyst comprising calcium chloride at a temperature between 225° and 450° C.

2. A process according to claim 1 wherein the gem-dialkoxy compound is a gem-dialkoxy alkane where R, R' and R'' are either hydrogen or alkyl groups having one to about seven carbon atoms and R''' is an alkyl group having one to about seven carbon atoms.

3. A process according to claim 2 wherein the catalyst comprises unsupported calcium chloride.

4. A process according to claim 2 wherein the catalyst comprises $CaCl_2$ distended on an inert non-acidic support.

5. A process according to claim 4 wherein the support is an infusorial earth.

6. A process according to claim 5 wherein the infusorial earth is diatomaceous earth.

7. A process according to claim 1 wherein the gem-dialkoxy compound is dimethylacetal and the unsaturated ether is methyl vinyl ether.

8. A process according to claim 7 wherein methyl alcohol is admixed with the dimethylacetal.

References Cited
UNITED STATES PATENTS

| | | | |
|---|---|---|---|
| 1,902,169 | 3/1933 | Herrman et al. | 260—614 |
| 1,931,858 | 10/1933 | Baur | 260—614 |
| 3,446,853 | 5/1967 | Newton et al. | 260—614 |

HOWARD T. MARS, Primary Examiner

U.S. Cl. X.R.

260—611, 632

PO-1050
(5/69)

UNITED STATES PATENT OFFICE
CERTIFICATE OF CORRECTION

Patent No. 3,546,300              Dated December 8, 1970

Inventor(s) Roger C. Williamson

It is certified that error appears in the above-identified patent and that said Letters Patent are hereby corrected as shown below:

Col. 1, line 38, "comprising chloride" should read --comprising calcium chloride--.

Col. 2, line 50, "buty vinyl" should be --butyl vinyl--.

Signed and sealed this 4th day of January 1972.

(SEAL)
Attest:

EDWARD M. FLETCHER, JR.
Attesting Officer

ROBERT GOTTSCHALK
Acting Commissioner of Patents